Sept. 4, 1951 — A. H. SAUTER — 2,567,029
THROW OUT DEVICE FOR DOOR OPERATORS
Filed Feb. 26, 1948
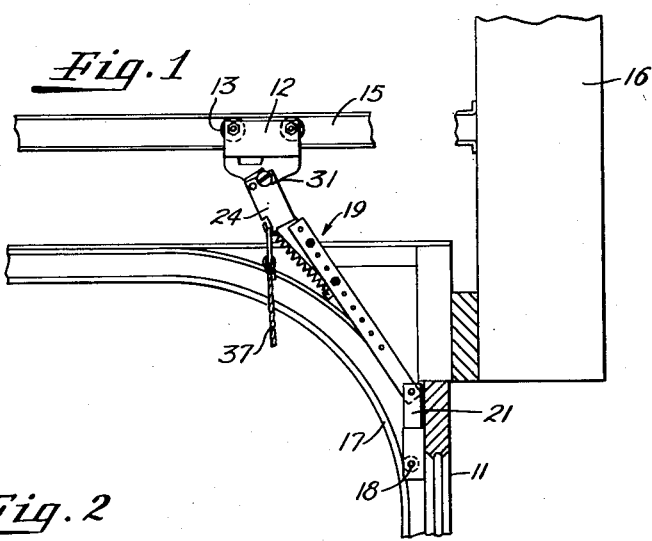
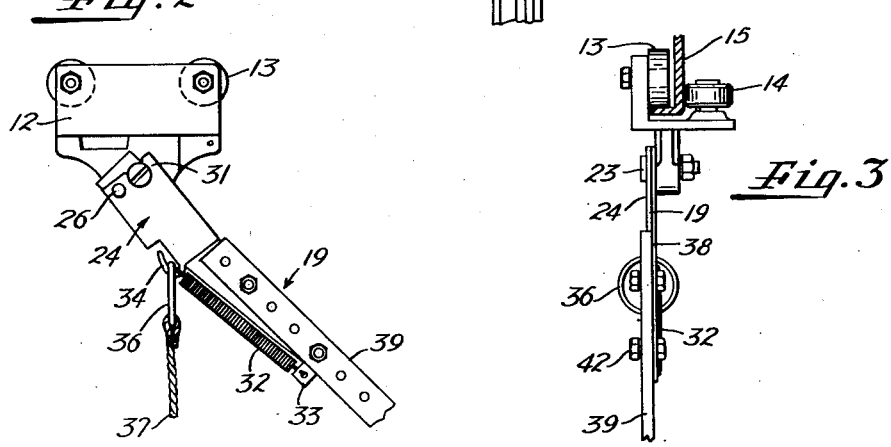
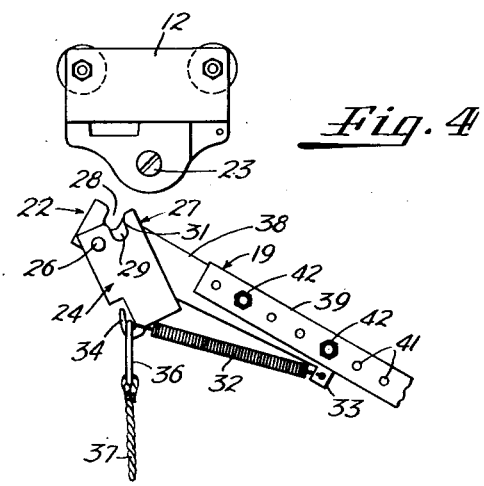
INVENTOR.
Alfred H. Sauter
BY
McCanna & Morsbach
ATTYS.

Patented Sept. 4, 1951

2,567,029

UNITED STATES PATENT OFFICE 2,567,029

THROWOUT DEVICE FOR DOOR OPERATORS

Alfred H. Sauter, Riverside, Ill., assignor to H. W. Crane Company, Chicago, Ill., a corporation of Illinois Application February 26, 1948, Serial No. 11,289

4 Claims. (Cl. 268—58)

This invention relates to door opening and closing apparatus and more particularly to a mechanism for readily connecting a door to and disconnecting it from a trolley or the like.

Electrically operated door openers are often installed in garages, warehouses, stores and other buildings located where there are frequent power outages. Very often during such power outages it is necessary to manually open a door which is controlled by an operator. With conventional door openers as soon as the power to the unit is shut off a brake automatically locks the component parts of the unit in position. Consequently to manually raise the door would require the application of a force of sufficient magnitude to overcome the brake and the inertia of the moving power parts of the opener. This would in most cases require a special force applying means or brake release mechanism both of which are undesirable from a cost standpoint and increasing the complexity of the unit. Accordingly it is an object of this invention to provide a novel connecting mechanism between the door and the trolley which permits the door to be quickly and readily disconnected from the trolley and which permits the door to be readily fastened to the trolley again as desired.

Another object of the invention is to provide a novel connecting means between the door and the trolley which is positive in its action, which is simple in construction, which has a minimum number of parts, which is compact and which is relatively inexpensive to manufacture.

Another object of the invention is to provide a novel mechanism of the above character which can be readily adjusted to a length corresponding to the distance between the trolley and the door so as to facilitate initial installation of the mechanism.

Other objects and advantages of the invention will become apparent from the following detailed description taken in connection with the accompanying drawings, in which—

Figure 1 is a side elevational view of an overhead door installation utilizing a mechanism embodying the present invention for connecting the door with the trolley;

Fig. 2 is an enlarged view similar to Figure 1;

Fig. 3 is an end view of Fig. 2, and

Fig. 4 is a view similar to Fig. 2 with the mechanism disconnected from the trolley.

The invention is shown embodied in a mechanism for connecting a door 11 to a trolley 12. To better understand the invention a brief description of the components with which the mechanism is used, follows. The trolley 12 is mounted in a conventional manner as by rollers 13 and 14 on an overhead rail 15 suitably supported on the interior of a building of which only the wall 16 having the door 11 is shown. The back and forth movement of the trolley 12 on the rail 15 controls the opening and closing of the door 11. Thus, as the trolley moves to the left as shown in Figure 1 the door is raised to an open position and when the trolley 12 is moved to the position as shown in Figure 1 the door is closed. In opening, the door 11 is moved from a vertical position to a horizontal position. To this end the door 11 is guided by conventional tracks or door guides 17 on opposite sides of the door shaped to receive rollers 18 mounted on opposite sides of the door. The tracks 17 are of suitable shape to guide the door to the desired position and are supported in a conventional manner on the end wall 16.

One aspect of the invention is to provide a mechanism wherein the door may be quickly and readily connected to and disconnected from the trolley as desired and which may be manufactured in a relatively inexpensive manner. As best shown in Figs. 1 and 2 the mechanism includes an arm or link 19 pivotally connected at one end to an angle iron 21, secured to the top of the door 11, and having its opposite end in the form of a jaw portion 22 (see Fig. 4) engageable with a projection or pin 23 rigid with the trolley 12. A bell crank lever 24 is pivotally mounted on the link 19 as by a pin 26 and has a jaw portion 27 engageable with the projection 23. In one position of the lever 24 the jaw portion 27 coacts with the jaw portion 22 to secure the mechanism in an assembled relation with the trolley and in another position of the lever 24 the jaw portion 27 is positioned so that the arm 19 may be readily connected to or disconnected from the trolley 12. Provision is made for normally urging the jaw portions 22 and 27 to the position in which the respective jaw portions coact to secure the arm 19 in an assembled relation with the projection 23.

As shown in Fig. 4 the jaw portion 22 is formed by a recess 28 on an upwardly facing edge of the arm 19 shaped to receive the pin 23. The jaw portion 27 on the bell crank lever 24 is also formed by a recess 29 on an edge thereof shaped to receive the pin 23. The respective recesses 28 and 29 are positioned so that with the bell crank 24, in the position shown in Figs. 1 and 2, the side wall 31 defining the recess 29 bridges the outer ends of the side walls defining the recess 28 and thus in effect serves to lock the pin 23 in the recess 28. The side wall 31 is sufficiently short so that when the bell crank lever 24 is moved to the position shown in Fig. 4 the mouths of the respective recesses are in substantial alinement. In this position the arm 19 may be either connected to or disconnected from the trolley 12.

Resilient means is utilized for maintaining the bell crank 24 in a position such that the side wall 31 bridges the recess 28. To this end a spring 32 is stretched between a lug 33 extending laterally of the arm 19 on the side thereof away from the recess 28 and a hook 34 formed on the bell crank lever 24. As shown in Figs. 1 and 2 when the jaw portions 22 and 27 encircle the pin 23 the line in which the spring force acts does not coincide with the line determined by the pivotal pin 26 of the lever 24 and the spring connections with the lug 33 and the hook 34. This means therefore that a pressure is constantly being exerted by the spring 32 to cause the jaw portion 27 of the bell crank lever 24 to move into engagement with the pin 23. With this construction a positive locking action by the side wall 31 is assured.

Provision is made wherein a force may be applied to the bell crank lever to rotate the latter to a point where the mouths of the recesses 28 and 29 are in a position in which the arm 19 may be readily connected to or disconnected from the trolley 12. For this purpose a ring 36 with a cord 37 is attached to the hook 34 to hang downwardly as shown in Figure 1. Inasmuch as the height of the trolley 12 is determined by the individual installation, the length of the cord may be adjusted as required. When it is desired to disconnect the door 11 from the trolley 12 it is only necessary to pull the cord 37 downwardly. This causes the bell crank 24 to rotate clockwise about the pin 26 against the action of the spring 32 to a position where the side wall 31 is moved out of the position in which it bridges the mouth of the recess 28 as shown in Fig. 2 to the position in which the mouth of the recess 28 is unobstructed as shown in Fig. 4. Normally the weight of the arm 19, lever 24, spring 32 and cord 36 is such that the action of gravity causes the arm to become detached from the trolley. It is to be understood that to connect the mechanism to the trolley the cord 37 is first pulled as above to bring the mouths of the recesses 28 and 29 into substantial alinement for the reception of the pin 23 on the trolley. The arm 19 is then positioned on the trolley. The cord 37 is released and the spring 32 acts to rotate the bell crank lever 24 to the position shown in Fig. 2 in which the jaw portions 22 and 27 engage the pin 23.

The available head room in a garage and the like necessarily dictates the height of the trolley 12 from the door. Accordingly different lengths of the arm 19 are required. Consequently, one phase of this invention is concerned with the provision of means for adjusting the length of the arm 19 to suit an individual installation. To this end the arm 19 is formed in two parts 38 and 39, one of which is adjustable relative to the other. As shown in Fig. 4 the part 39 is formed with a plurality of spaced holes 41. The parts 38 and 39 are normally held together by bolts 42. To adjust the length of the arm 19 it is simply a matter of moving the parts 38 and 39 relative to each other to obtain the desired overall length of the arm and then insert the bolts 42 in the proper holes.

The above construction can be readily manufactured. The portions 38, 39 and bell crank lever 24 may be readily formed as metal stampings, simple castings and the like and consequently machining and manufacturing costs are minimized. The above construction is compact, simple and is positive in its action.

While I have shown one embodiment of my invention it will be understood that I do not wish to be limited thereto since many modifications may be made and I therefore contemplate by the claims to cover such modifications as fall within the true spirit and scope of my invention.

I claim:

1. The combination of an overhead trolley or the like movable between preselected positions and having a projection formed thereon, and a door arranged to be moved between an open and a closed position with a rigid link having a notch for receiving said projection formed along one edge thereof adjacent one end and having its opposite end arranged to be pivotally connected to the door, a bell crank lever pivotally mounted on said link and movable between preselected positions, said lever having a notch formed along one edge defined by side walls for receiving said projection, means for maintaining said bell crank lever in one position in which one of the side walls of the notch on the bell crank lever bridges the mouth of the notch formed on the link to form a locking connection between the projection and link to secure the door to the trolley to effect movement of the former in response to movement of the latter, and means for applying a force to said bell crank lever for moving the latter against the action of the last mentioned means to move the bell crank lever to a position in which the mouths of the respective notches are positioned to permit the link to be connected to and disconnected from the trolley.

2. In a mechanism for quickly attaching and releasing a door or the like to and from an overhead trolley or the like having a projection or the like formed thereon, the combination of a link arranged to be attached to a door at one end and having a first jaw portion for receiving said projection at its opposite end, said link having a lug extending laterally thereof on the side of the link away from the jaw portion, a lever pivotally mounted on said link for movement between preselected positions and having a second jaw portion, in one position of the lever said second jaw portion shaped to receive said projection and to coact with said first jaw portion to secure said link and lever in an assembled relation with said projection and in another position of the lever with respect to the link permitting the link and lever to be connected to and disconnected from the projection, said lever having a hook formed thereon in the plane of the link spaced from the second jaw portion, and spring means acting between said lug and said hook to urge the jaw portions to a position for securing the link and lever in an assembled relation with the projection.

3. In a mechanism for quickly attaching and releasing a door or the like to and from an overhead trolley or the like having a projection formed thereon, the combination of an arm arranged to be pivotally attached to a door and having a first jaw portion for receiving said projection, said link having a lug extending laterally thereof on the side of the link away from the first jaw portion, a lever pivotally mounted on said link for movement between preselected positions and having a second jaw portion shaped in one position of the lever to receive said projection and coacting with said first jaw portion to secure said arm in an assembled relation with said projection and in another position of the lever permitting the arm to be engaged with and disengaged from the projection, said lever having a hook formed thereon in the plane of the lever, and spring means acting between said lug and said hook to urge the jaw portions to a position for securing the arm in an assembled relation with the projection, said spring means being disposed laterally of the arm and the lever and substantially in the plane thereof to form a narrow compact structure.

4. The combination of an overhead trolley movable between preselected positions and having a projection formed thereon, a door arranged to be moved between an open and a closed position, a rigid arm attached at one end to said door and having a first jaw portion for receiving said projection at its opposite end, a lever pivotally mounted on said arm for movement between first and second positions and having a second jaw portion, said second jaw portion in the first position of the lever shaped to receive said projection and to coact with said first jaw portion to secure said arm in assembled relation with said projection to secure the door to the trolley and in the second position of the lever shaped to permit connection and disconnection of the arm with the projection to attach the door to the trolley or release it therefrom, spring means normally maintaining the second jaw portion in the first position, and means for applying a force to said lever to move the latter to the second position.

ALFRED H. SAUTER.

REFERENCES CITED

The following references are of record in the file of this patent:

UNITED STATES PATENTS

| Number | Name | Date |
| --- | --- | --- |
| 974,566 | Giles | Nov. 1, 1910 |
| 1,043,177 | Waibel | Nov. 5, 1912 |
| 1,641,551 | Rudberg | Sept. 6, 1927 |
| 2,072,525 | Mann | Mar. 2, 1937 |
| 2,134,615 | Lamb | Oct. 25, 1938 |
| 2,175,651 | Thomas | Oct. 10, 1939 |
| 2,269,759 | Dollins | Jan. 13, 1942 |
| 2,312,475 | Peterson | Mar. 2, 1943 |
| 2,330,533 | Wiley | Sept. 28, 1943 |
| 2,442,295 | Kuendel | May 25, 1948 |